Figure 1:
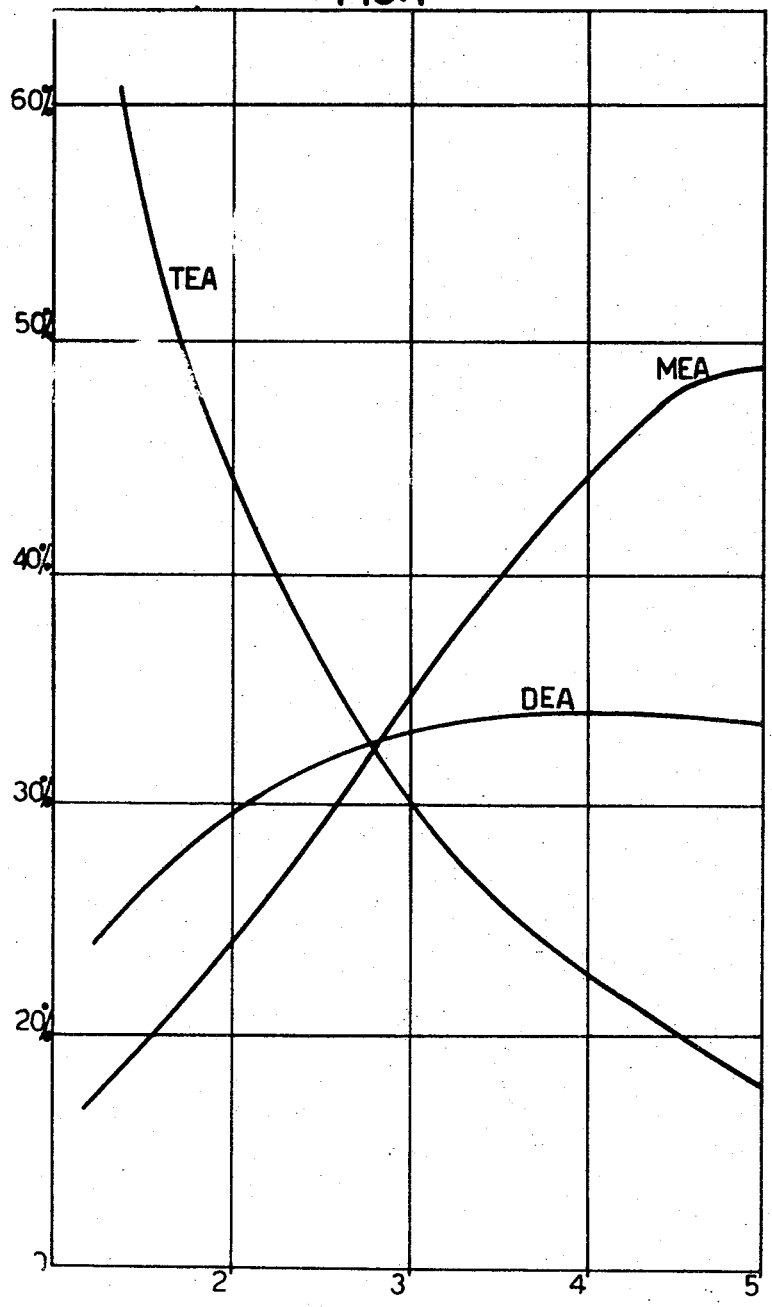

United States Patent
Cocuzza

[11] 3,849,262
[45] Nov. 19, 1974

[54] PROCESS FOR THE SEPARATION OF MONOETHANOLAMINE, DIETHANOLAMINE, AND TRIETHANOLAMINE FROM CRUDE ETHANOLAMINE MIXTURES

[75] Inventor: Gioacchino Cocuzza, Catania, Italy
[73] Assignee: Societa Italiana Resine S.I.R. S.p.A., Milan, Italy
[22] Filed: July 18, 1973
[21] Appl. No.: 380,526

[30] Foreign Application Priority Data
Sept. 20, 1972  Italy.................................. 29422/72

[52] U.S. Cl....................... 203/38, 203/99, 203/58, 260/584 R
[51] Int. Cl......................... B01d 3/34, C07c 91/02
[58] Field of Search............. 260/584 R; 203/57, 58, 203/63, 38, 99

[56] References Cited
UNITED STATES PATENTS

| | | | |
|---|---|---|---|
| 1,904,013 | 4/1933 | Reid et al. | 260/584 |
| 2,823,236 | 2/1958 | Lowe et al. | 260/584 |
| 2,892,775 | 6/1959 | Anderson | 260/584 |
| 3,453,183 | 7/1969 | Okubo et al. | 260/584 |
| 3,697,598 | 10/1972 | Weibull et al. | 260/584 |
| 3,723,530 | 3/1973 | Goetze et al. | 260/584 |

Primary Examiner—Wilbur L. Bascomb, Jr.
Attorney, Agent, or Firm—Sughrue, Rothwell, Mion, Zinn and Macpeak

[57] ABSTRACT

Process for the separation of monoethanolamine, diethanolamine, and triethanolamine from crude ethanolamine mixtures containing ethylene glycol, obtained by reaction of aqueous ammonia with ethylene oxide, which comprises feeding the crude ethanolamine mixture into a distillation column at a point between the top and the bottom of the column, withdrawing monoethanolamine from the top of the column, withdrawing a side stream that contains monoethanolamine and ethylene glycol at a point situated between the top of the column and the point at which the crude ethanolamine mixture is introduced, reacting the side stream with ethylene oxide and separating from the reaction product the ethylene glycol from the diethanolamine and triethanolamine.

5 Claims, 2 Drawing Figures

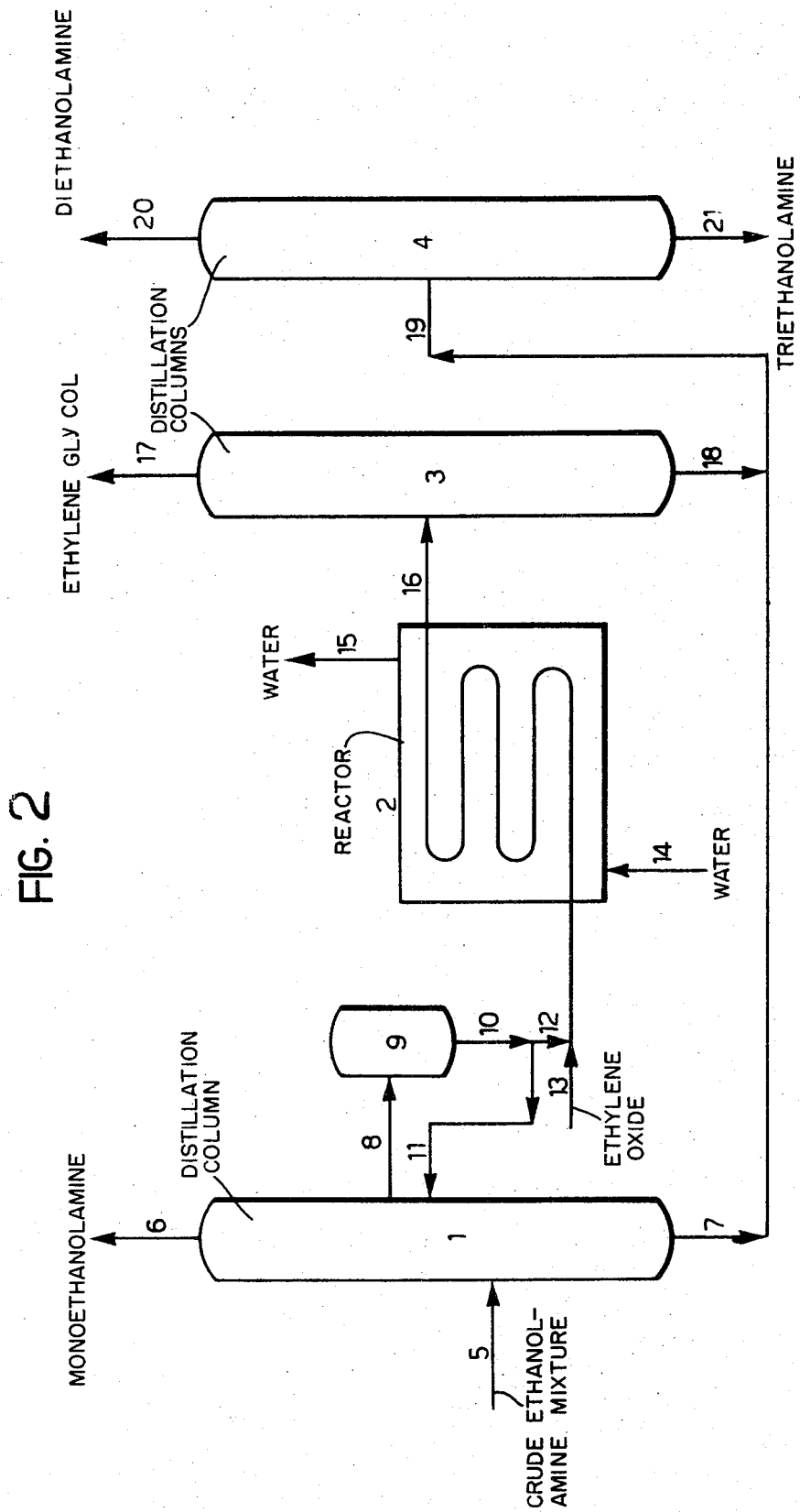

PROCESS FOR THE SEPARATION OF MONOETHANOLAMINE, DIETHANOLAMINE, AND TRIETHANOLAMINE FROM CRUDE ETHANOLAMINE MIXTURES

The invention relates to a process for the separation of monoethanolamine, diethanolamine, and triethanolamine from crude ethanolamine mixtures obtained by reaction of ammonia with ethylene oxide.

Ethanolamines can be prepared by reaction of ethylene halohydrins or ethylene oxide with ammonia. The industrial production of ethanolamines is at present carried out almost exclusively by the reaction of ethylene oxide with ammonia. In one known process, ethylene oxide and gaseous ammonia are brought into contact in a reaction chamber heated to 120° to 275°C; cf. U.S. Pat. No. 2,373,199.

Preferably, ethylene oxide is brought into contact with aqueous ammonia at lower reaction temperatures, usually 50° to 100°C; cf. U.S. Pat. No. 2,275,470. In this way one obtains a reaction mixture containing monoethanolamine, diethanolamine, and triethanolamine, the ratio of the various ethanolamines depending on the molar ratio of the reactants used. For example, when an excess of ammonia is used the reaction product consists mainly of monoethanolamine, whereas a fairly large excess of ethylene oxide favours the formation of triethanolamine. It is not possible in any case to obtain a given ethanolamine as the sole product in the reaction of ammonia with ethylene oxide. Therefore, the terms "ethanolamines" and "crude ethanolamine mixture" are used in the following description to denote the reaction mixture containing monoethanolamine, diethanolamine, and triethanolamine.

Pure ethanolamines or ethanolamine mixtures are valuable chemical products. For example, triethanolamine is an excellent corrosion inhibitor. Mixtures of monoethanolamine and diethanolamine are used in various industrial processes for the separation of hydrogen sulphide and carbon dioxide from gas mixtures. The reaction products of ethanolamines with fatty acids are also widely used as emulsifiers and surfactants, e.g. in detergents. Finally, ethanolamines are valuable starting materials for the preparation of pharmacologically active compounds.

A disadvantage of the usual processes for the production of ethanolamines by the reaction of ethylene oxide with aqueous ammonia is that ethylene glycol is formed as a by-product. The formation of this by-product, which results from the hydrolysis of ethylene oxide, is favoured by the presence of water at the usual reaction temperatures in the basic reaction medium.

The presence of ethylene glycol in ethanolamine mixtures can be accepted for various applications, e.g. in the separation of carbon dioxide and hydrogen sulphide from gas mixtures, but pure products are necessary in certain cases. This presents the problem of separating ethylene glycol from crude ethanolamine mixtures, obtained by reaction of ammonia and ethylene oxide, by fractional distillation. Difficulties are encountered here, since the boiling point of ethylene glycol is very close to the boiling point of monoethanolamine. Efforts have therefore been made to suppress the formation of ethylene glycol. To this end, ethylene oxide is brought into contact with an aqueous ammonia solution having a high ammonia content, with the result that the quantity of water present in the reaction medium is reduced. However, this process does not lead to entirely satisfactory results, since the formation of ethylene glycol, though reduced, cannot be completely prevented. In other known processes, the separation of ethylene glycol is carried out by fractional distillation in columns with a large number of plates and using high reflux ratios. However, these processes are expensive and associated with some uncertainty.

One object of the invention is therefore to provide a process for the separation of monoethanolamine, diethanolamine, and triethanolamine in the pure form from crude ethanolamine mixtures obtained by reaction of aqueous ammonia with ethylene oxide that does not have the above-mentioned disadvantages. This purpose is achieved by the invention.

It has been found in accordance with the invention that ethylene glycol can be separated from crude ethanolamine mixtures if a side stream consisting of monoethanolamine and ethylene glycol is taken from the column used for the distillation of the monoethanolamine and allowed to react with excess ethylene oxide, whereupon higher-boiling products, mainly diethanolamine, are formed.

The invention thus relates to a process for the separation of monoethanolamine, diethanolamine, and triethanolamine from crude ethanolamine mixtures containing ethylene glycol, obtained by reaction of aqueous ammonia with ethylene oxide, characterized in that a. the crude ethanolamine mixture is fed into a distillation column at a point between the top and the bottom of the column,
b. monoethanolamine is removed from the top of this column,
c. a side stream that contains monoethanolamine and ethylene glycol in a weight ratio of about 1:1 to 20:1 is removed at a point situated between the top of the column and the point at which the crude ethanolamine mixture is introduced,
d. this side stream is mixed with sufficient ethylene oxide to give a weight ratio of ethylene oxide to monoethanolamine of about 1:1 to 1.4:1 and allowed to react at temperatures of at most 50°C for about 20 to 120 minutes, and
e. the ethylene glycol is separated from the diethanolamine and triethanolamine in the reaction product.

Preferably the crude ethanolamine mixture is fed into the lower half of the column.

For the production of the crude ethanolamine mixture, ethylene oxide is generally allowed to react at temperatures of about 50° to 100°C with an aqueous ammonia solution whose ammonia content is about 15 to 50 wt.%. After separation of water and unreacted ammonia, one obtains a reaction product whose composition depends on the molar ratio of ammonia to ethylene oxide, as can be seen from FIG. 1. In FIG. 1 the abscissa shows the molar ratio of ammonia to ethylene oxide and the ordinate shows the composition of the ethanolamine mixture in wt.%. The abbreviations MEA, DEA and TEA denote monoethanolamine, diethanolamine and triethanolamine. This reaction product also contains about 0.5 to 2.0 wt.% of ethylene glycol, depending on the reaction temperature and the water content of the reaction medium. Monoethanolamine, diethanolamine, and triethanolamine can be separated in the pure form from this mixture by the process in accordance with the invention.

FIG. 2 illustrates the preferred embodiment of the process of the invention. A crude ethanolamine mixture is introduced through the pipe 5 at a point between the top and the bottom of the distillation column 1, which contains 10 to 20 plates. Plate columns or packed columns may be used. The ethanolamines are introduced between the fourth and eighth plates. The distillation is carried out at a pressure of about 5 to 60 mm Hg and with a reflux ratio of about 1 to 4.

A side stream containing ethylene glycol and monoethanolamine is removed from the column 1 through the pipe 8. The weight ratio of monoethanolamine to ethylene glycol in this side stream should be about 1:1 to 20:1, preferably about 4:1 to 8:1.

The point at which the side stream is removed is situated between the point at which the crude ethanolamine mixture is introduced and the top of the column, generally between the eighth and the fourteenth plates. Pure monoethanolamine is removed through the pipe 6 at the top of the column 1. A mixture consisting essentially of diethanolamine and triethanolamine is removed through the pipe 7 at the bottom of the column. The side stream removed through 8 is received in a container 9, from which it is removed through the pipe 10. The side stream is partly recycled through the pipe 11 to the column 1, while the remainder is led through the pipe 12 together with ethylene oxide to the reactor 2. The ethylene oxide is introduced through the pipe 13.

The weight ratio of ethylene oxide in the reaction mixture fed into the reactor 2 should be about 1:1 to 1.4:1. A temperature of at most 50°C, preferably about 20° to 50°C, is maintained in the reactor 2. The contact time is about 20 to 120 minutes. A tubular reactor externally cooled by circulating water is preferably used. In FIG. 2, the inlet for the cooling water for the tubular reactor 2 is at 14 and the outlet at 15.

Under the indicated reaction conditions, monoethanolamine is almost completely converted into higher-boiling products in the reactor 2. The reaction mixture from the reactor 2 is introduced through the pipe 16 into the distillation column 3, where it is fractionally distilled. Ethylene glycol is removed through the pipe 17 at the top of the distillation column, and a mixture consisting essentially of diethanolamine and triethanolamine is removed through the pipe 18 at the bottom of the column. The distillation column 3 is generally operated at a pressure of 5 to 50 mm Hg and with a reflux ratio of about 1 to 3. The products obtained at the bottom of the distillation column 3 are introduced into the distillation column 4 through the pipe 19 together with the products from the column 1.

Diethanolamine is removed from the distillation column 4 through the pipe 20 at the top of the column. A product consisting essentially of triethanolamine is removed through the pipe 21 at the bottom of the distillation column 4.

The invention is further illustrated by the following non-limiting example.

EXAMPLE 1

The reference numbers used in this example relate to FIG. 2.

A mixture consisting of 40 wt.% of monoethanolamine, 32 wt.% of diethanolamine, 27 wt.% of triethanolamine, and 1 wt.% of ethylene glycol obtained by the reaction of ethylene oxide with an aqueous ammonia solution at a molar ratio of ammonia: ethylene oxide of 3.5:1 is introduced into the column 1 through the pipe 5.

The column 1 contains 20 plates, the crude ethanolamine mixture being introduced at the level of the eighth plate. The distillation in column 1 is carried out at a pressure of 20 mm Hg and with a reflux ratio of 3. A mixture consisting of 70 mole % of monoethanolamine and 10 mole % of ethylene glycol is removed through the pipe 8 at the level of the twelfth plate. Monoethanolamine having a purity of 99.7% and a ethylene glycol content of 0.1 mole % is obtained through the pipe 6 at the top of the column 1. The side stream taken from the column 1 through the pipe 8 is collected in 9 and then removed through the pipe 10. Part of this side stream is returned to the column 1 through the pipe 11, while the remainder is introduced through the pipe 12 into the reactor 2.

The reactor 2 consists of a tube with a diameter of 75 mm and a length of 100 m. Ethylene oxide is introduced through the pipe 13 in a quantity such that the molar ratio of ethylene oxide to monoethanolamine at the reactor inlet is 2:1. The reactor 2 is operated at a temperature of 40°C, the temperature being controlled by external water cooling. The contact time in the reactor is 1 hour, and the flow rate of the reactants is 1.7 m/minute. A mixture consisting of 10 mole % of ethylene glycol, 19.5 mole % of diethanolamine, 70 mole % of triethanolamine, and 0.5 mole % of monoethanolamine is obtained from the reactor 2 through the pipe 16.

This mixture is introduced into the distillation column 3, which has 15 plates, at the level of the tenth plate. This column is operated at a pressure of 10 mm Hg and with a reflux ratio of 2.5. A mixture containing 92 mole % of ethylene glycol and 5 mole % of monoethanolamine is obtained at the top of the column through the pipe 17. The base product of the column 3, which contains 98 mole % of triethanolamine, is led out through the pipe 18.

This product is introduced into the distillation column 4 through the pipe 19 together with the base product from the column 1. Diethanolamine is taken from the top of the column 4 through the pipe 20, while triethanolamine is removed at the bottom of the column through the pipe 21.

I claim:

1. A process for the separation of monoethanolamine, diethanolamine and triethanolamine from crude ethanolamine mixtures containing ethylene glycol obtained by the reaction of aqueous ammonia with ethylene oxide, comprising the steps of:
   a. introducing the crude ethanolamine mixture into a distillation column at a point situated between the top of the column and the bottom of the column;
   b. removing monoethanolamine at the top of the column;
   c. removing diethanolamine and triethanolamine at the bottom of the column;
   d. removing a side stream containing monoethanolamine and ethylene glycol in a weight ratio of 1:1 to 20:1, respectively, at a point situated between the top of the column and the point at which the crude ethanolamine mixture is introduced;

e. mixing the side stream with ethylene oxide in a quantity such that the weight ratio of ethylene oxide to monoethanolamine is about 1:1 to 1.4:1 and reacting the resulting mixture for about 20 to 120 minutes at temperatures of at most 50°C to yield a reaction product comprising diethanolamine, triethanolamine and ethylene glycol; and f. separating the ethylene glycol in the reaction product from the diethanolamine and triethanolamine in the reaction product.

2. Process in accordance with claim 1, wherein the side stream contains monoethanolamine and ethylene glycol in a weight ratio of about 4:1 to 8:1.

3. Process in accordance with claim 1, wherein the crude ethanolamine mixture is introduced into a distillation column having 10 to 20 plates at a point between the fourth and the eighth plates from the bottom, the side stream is removed at a point between the eighth and the fourteenth plates from the bottom, and the distillation is carried out at a pressure of about 5 to 20 mm Hg and with a reflux ratio of about 1 to 4.

4. Process in accordance with claim 1, wherein the temperature of the reaction in step (e) is maintained at about 20° to 50°C by circulating water in an externally cooled tubular reactor.

5. Process in accordance with claim 1, wherein the separating of step (f) comprises introducing said reaction product into a distillation column operated at a pressure of 5 to 50 mm Hg and with a reflux ratio of about 1 to 3.

* * * * *